Aug. 30, 1966

S. LOW 3,270,269

D.C. CONTROL AND AMPLIFYING CIRCUITS

Filed Nov. 23, 1962

INVENTOR.
SOL LOW

Aug. 30, 1966     S. LOW     3,270,269
D.C. CONTROL AND AMPLIFYING CIRCUITS
Filed Nov. 23, 1962     3 Sheets-Sheet 2

INVENTOR.
SOL LOW
BY

INVENTOR.
SOL LOW

United States Patent Office 3,270,269
Patented August 30, 1966

1

3,270,269
D.C. CONTROL AND AMPLIFYING CIRCUITS
Sol Low, Bronx, N.Y., assignor, by mesne assignments, to Avion Electronics, Incorporated, Wilmington, Del., a corporation of Delaware
Filed Nov. 23, 1962, Ser. No. 239,457
11 Claims. (Cl. 321—2)

The present invention relates to a high efficiency control circuit utilizing transistors and controlled rectifiers and operated from a D.C. voltage source for providing D.C. voltage regulation, amplification or other types of control.

One embodiment of the invention is a series type D.C. regulator providing an output voltage which is relatively constant with respect to input line change and output load change. The series control device includes preferably a pair of silicon controlled rectifiers which are switched on alternately for a length of time determined by a suitable controller such as a magnetic amplifier. The circuit also includes a generator for producing rectangular wave voltages in series with the applied unregulated voltage and in synchronism with the voltages provided by the magnetic amplifier. The magnetic amplifier, in turn, is controlled by a circuit which compares the output voltage with a reference voltage. Either the output of the silicon controlled rectifiers or the output of the rectangular wave generator is used to provide a regulated D.C. output voltage. A regulator of this type is found to have an efficiency of about 80 percent and a regulation of about one percent for changes between full load and one fourth full load.

Another embodiment of the invention utilizes the circuit arrangement described above, except that in place of the reference voltage the control winding of the magnetic amplifier is supplied with an input or control signal. The output of the circuit, therefore, varies in accordance with the input signal for providing an amplified signal.

An object of the invention is to control, amplify or regulate a D.C. voltage variably and with a high efficiency.

Another object of the invention is to provide a high efficiency D.C. regulator capable of handling high currents and large amounts of power, in the kilowatt range for example.

Another object of the invention is to provide a D.C. regulated voltage source which is of small size and weight.

Additional objects and advantages of the invention will appear from the following description and the accompanying drawing, wherein.

Figure 1:
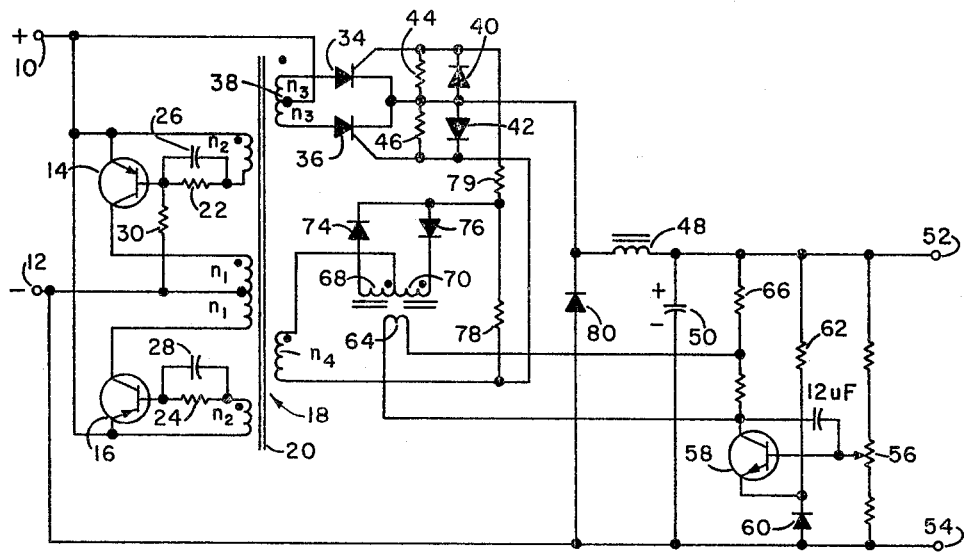
FIG. 1 is a circuit diagram of one embodiment of the invention.

Referring to FIG. 1, an unregulated, or variable, D.C. voltage is applied to input terminals 10 and 12. These terminals are connected to a rectangular wave generator, such as a multivibrator, including transistors 14 and 16 and transformer 18 having a saturable core 20 which has an approximately square-loop hysteresis curve. The emitter and base electrodes of transistors 14 and 16 are connected through resistors 22 and 24 and capacitors 26 and 28 and windings $n_2$. At least one base is connected through resistor 30 to terminal 12. The collectors are connected to windings $n_1$, and the emitters are

Figure 3A:
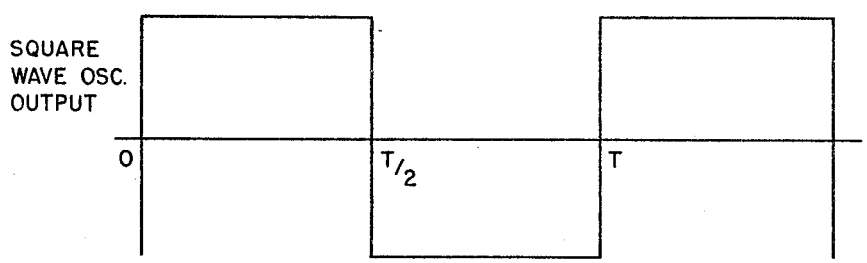
FIGS. 3A to 3E are charts illustrating the operation of the circuit of FIG. 1.

2 connected to terminal 10. The transistor circuit just described is a free-running multivibrator having an output of the form shown in FIG. 3A.

Transformer 18 includes secondary windings $n_3$ connected between the anodes of silicon controlled rectifiers 34 and 36, hereafter called SCR's. A center tap 38 is connected to input terminal 10. The gate electrodes and cathodes of the SCR's are connected together by rectifiers and resistors 40, 42, 44 and 46. Triggering voltages for the SCR's are supplied by a magnetic amplifier which will be described later.

Figure 3B:
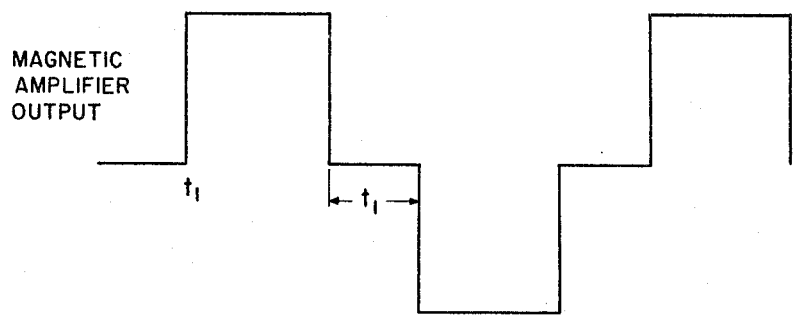
Figure 3C:
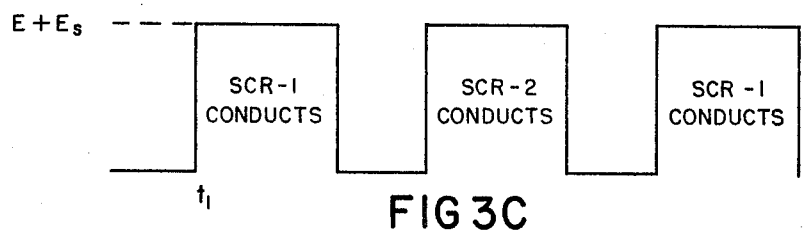
Figure 3D:

The output of SCR's 34 and 36 is fed through an inductor 48 across capacitor 50 to output terminals 52 and 54. The portion of the output voltage between terminal 54 and the tap on potentiometer 56 is applied to the base of transistor 58. A reference voltage is developed across zener diode 60 and applied to the emitter of transistor 58, by connecting the zener diode to terminal 52 through resistor 62. Thus a sample of the output voltage is compared to the reference voltage by the emitter-base circuit and is used for controlling the output current from the collector electrode of transistor 58 through magnetic amplifier control winding 64 and resistor 66. The magnetic amplifier has current windings 68 and 70 supplied by secondary winding $n_4$ of transformer 18 through oppositely poled rectifiers 74 and 76 and resistor 78. The output voltage pulses across resistor 78 have the form shown in FIG. 3B, the time of initiation of these pulses being controlled by the voltage applied to the base of transistor 58. The voltage pulses are applied to the input circuit of SCR's 34 and 36 through resistor 79. SCR's 34 and 36 conduct alternately. The voltage $E_s$ developed across each secondary winding $n_3$ is added to the input voltage E between terminals 10 and 12, so that the output voltage of SCR's 34 and 36 may approach $E+E_s$. The negative values of $E_s$ reduce the anode voltage of the SCR's. The current in control winding 64, for a given operating condition, is shown in FIG. 3D. A rectifier 80 is preferably connected across the output circuit. Inductor 48 and capacitor 50 form a filter for smoothing the output at terminals 52 and 54 to provide a regulated D.C. output.

The operation of the circuit described above may be summarized as follows. Transistors 14 and 16 are coupled by saturable core transformer 18 and connected to input terminals 10 and 12 to form a square wave oscillator. SCR's 34 and 36 are series control elements for regulating the output voltage. The output pulses of SCR's 34 and 36 are integrated by filters 48, 50 to provide a D.C. output at terminals 52 and 54. The output voltage is sampled at 56 and compared to a reference voltage developed across zener diode 60 to provide a resultant voltage controlling the output current of transistor 58. This output current controls the magnetic amplifier circuit 64–78, which in turn determines the length of time SCR's 34 and 36 conduct. Thus series regulation of the output current and voltage is provided.

Figure 3E:
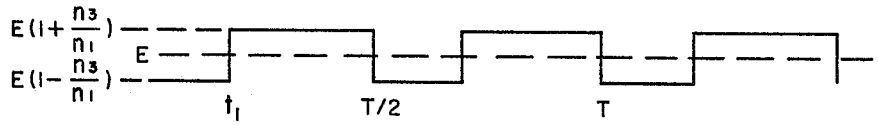

Let it be assumed that $n_1$ to $n_4$ designate the number of turns of the respective windings, that T is the period of the square wave oscillator, and $t_1$ is the time after each half cycle that a triggering pulse is produced by the magnetic amplifier. If $n_3$ is greater than $n_1$, the conducting SCR will be cut off when the square wave voltage reverses, as shown in FIG. 3C. (It is assumed transformer 18 is ideal and the voltage drops across the transistors and SCR's are negligible.) The other SCR will become conductive when a triggering pulse is produced by the magnetic amplifier at time $t_1$ after the square wave reversal. If $n_3$ is less than $n_1$, the conducting SCR may continue to conduct after a square wave reversal, but with a smaller output, until the other SCR is triggered on at a time $t_1$ after the beginning of a half cycle. The outputs of the SCR's, therefore, appear as shown in FIG. 3E. Rectifier 80 is only necessary when winding $n_3$ has more turns than winding $n_1$. During portions of the cycle the collector current may reverse in transistors 14 and 16, and if it is desired not to rely on the bilateral characteristics of the transistors, a rectifier is connected directly between each emitter and collector poled in the direction of the emitter.

Figure 2:
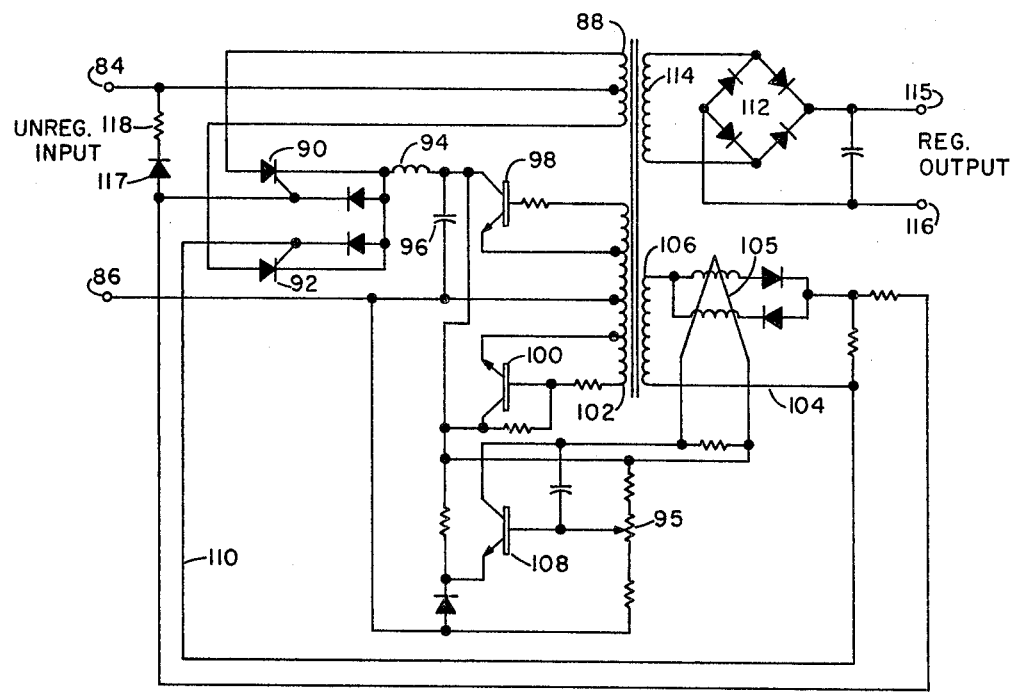
FIG. 2 is a block diagram of another embodiment of the invention.

The circuit of FIG. 2 is generally similar to that of FIG. 1. An unregulated D.C. voltage is applied to input terminals 84 and 86. Terminal 84, assumed to be the positive one, is connected through secondary winding 88 to SCR's 90 and 92. The output of the SCR's, developed across filter circuit 94, 95 and 96 energizes the square wave oscillator including transistors 98 and 100, and transformer 102. A magnetic amplifier 104 is coupled to the square wave oscillator by winding 106. The control winding 105 of magnetic amplifier 104 is supplied by transistor amplifier 108, similar to amplifier 58 of FIG. 1, in response to the voltage across resistors 95. The pulse output of magnetic amplifier 104 is fed over conductors 110 to the gate electrodes of SCR's 90 and 92. The regulated square wave output is impressed by transformer 102 on full wave rectifier 112 through winding 114. A regulated D.C. output therefore appears at terminals 115, 116. In order to insure starting of the circuit a starting pulse is supplied to the gate of SCR 90 through a zener diode 117 and a resistor 118 connected between that gate and input terminal 84.

It will be apparent that the operation of the circuit of FIG. 2 is similar to that of FIG. 1, except that the SCR circuit is connected ahead of the square wave oscillator. Transistors 98 and 100 are supplied with a regulated voltage, and the output of these transistors supplies the entire load circuit 112–116 and also the regulating SCR's 90 and 92. Since SCR circuit 90–96, oscillator or switching circuit 98–102, magnetic amplifier 104 and feedback circuit 95, 108 are similar to the corresponding circuits of FIG. 1, the operation of the circuit of FIG. 2 need not be described further.

Figure 4:
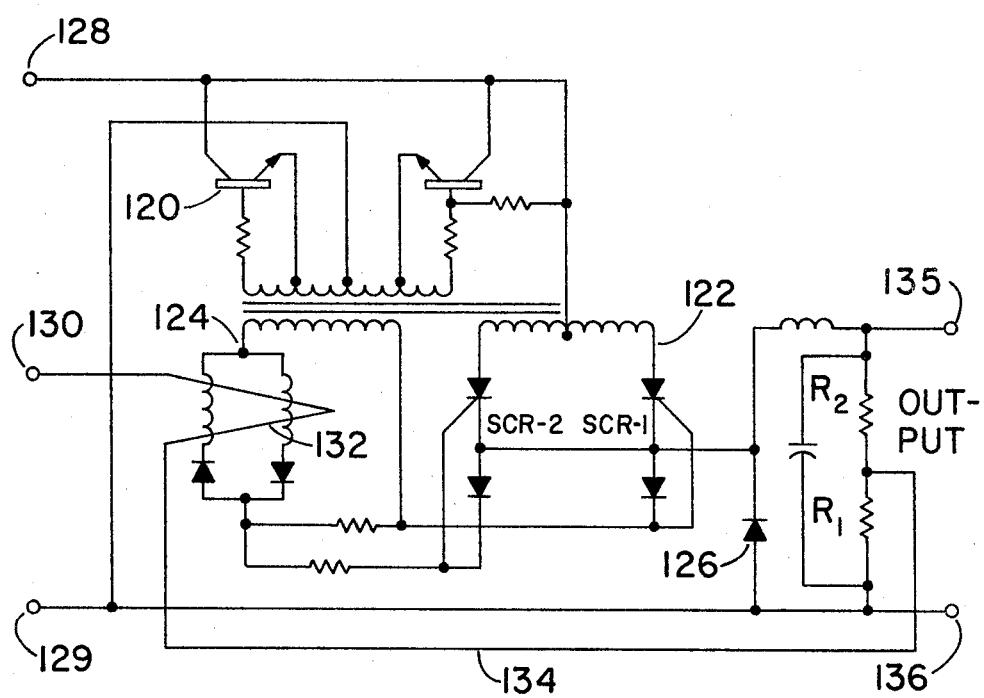
FIG. 4 is a circuit diagram of another embodiment of the invention.

FIG. 4 shows a circuit generally similar to that of FIG. 1 including a square wave oscillator 120, a controlled rectifier circuit 122, a magnetic amplifier 124, and an output circuit 126. A D.C. voltage is applied between terminals 128 and terminal 129, which may be at ground potential. A control signal is applied to terminal 130, connected to control winding 132. The other end of winding 132 is connected to an intermediate potential point of output circuit 126 through conductor 134. Thus the current through control winding 132 is determined by the difference between the input signal voltage and the portion of the output voltage fed back over conductor 134. The input signal controls the timing of the pulses produced by magnet amplifier 124 and, therefore, controls the output voltage between terminals 135, 136. Thus the circuit operates as an amplifier and the gain of the amplifier is proportional to $$\frac{R_2+R_1}{R_1}$$

where $R_1$ and $R_2$ are the values of the resistors between terminals 135 and 136.

The core 20 is made of one of the known materials having a nearly square hysteresis loop, a high saturation flux density, and good efficiency to about 3000 c.p.s. The operation of the square wave oscillator at a high frequency permits the choke coil 48 and transformer 18 to be small. The silicon controlled rectifiers have a suitable current rating for the purpose intended, for example 50 amperes each. Since all the active power elements operate in a switching mode, power loss is kept to a minimum and the efficiency of the circuit is high. The output voltage may exceed the input voltage, by virtue of the added voltage $E_s$ of the square wave oscillator.

I claim:
1. A voltage regulator comprising
 (a) a power supply circuit including a pair of terminals for receiving an unregulated D.C. voltage,
 (b) a square wave oscillator connected to said terminals for energization by said unregulated D.C. voltage,
 (c) a pair of silicon controlled rectifiers connected in parallel to one of said terminals,
 (d) an output circuit connected between the other of said pair of terminals and said silicon controlled rectifiers,
 (e) control means connected to the output of said square wave oscillator for generating triggering pulses and applying the same to the gate electrodes of said silicon controlled rectifiers,
 (f) means for controlling the timing of said triggering pulses in response to variations of the voltage across said output circuit,
 (g) and means for impressing the output of the square wave oscillator on the anodes of the silicon controlled rectifiers in pushpull relationship and in series with the unregulated D.C. voltage.

2. Apparatus according to claim 1, wherein said oscillator is a free running multivibrator.

3. Apparatus according to claim 1, wherein said control means includes magnetic amplifier means for producing successive pulses of opposite polarity.

4. A voltage regulator comprising
 (a) a pair of input terminals for receiving an unregulated D.C. voltage,
 (b) a square wave oscillator connected to said terminals, including a transformer having a saturable core which has a nearly rectangular hysteresis loop,
 (c) said transformer having a secondary winding having a midpoint connected to one of said input terminals,
 (d) a pair of silicon controlled rectifiers having their anodes connected to opposite ends of said secondary winding,
 (e) a pair of output terminals one of which is connected to the cathodes of said silicon controlled rectifiers, the other output terminal being connected to the other input terminal,
 (f) control means connected to said square wave oscillator for generating triggering pulses of alternately positive and negative polarity and applying the same between the gate electrodes of said silicon controlled rectifiers,
 (g) and means for controlling the timing of said triggering pulses in response to the voltage between said output terminals.

5. A direct current voltage regulator comprising
 (a) a pair of terminals for receiving an unregulated D.C. voltage,
 (b) an oscillator connected to said terminals,
 (c) a controlled rectifier having an anode, a cathode, and a gate electrode,
 (d) means for impressing said unregulated D.C. voltage and an alternating output voltage of said oscillator in series between the anode and cathode of said controlled rectifier,
 (e) control means connected to said oscillator for generating a triggering pulse during each cycle of said alternating output voltage,
 (f) means for applying the triggering pulses between the gate and cathode of said controlled rectifier,
 (g) an output circuit connected to said controlled rectifier including a filter for converting the output of said rectifier to a steady D.C. voltage,
 (h) and means connected between the output circuit and said control means for changing the time of occurrence of said triggering pulses in accordance with the value of said steady D.C. voltage of the output circuit.

6. A direct current control circuit comprising
  (a) a circuit including a pair of silicon controlled rectifiers having an anode, a cathode and a gate electrode,
  (b) a direct current voltage supply circuit connected across said controlled rectifier circuit,
  (c) a square wave oscillator connetced in cascade with said controlled rectifier circuit,
  (d) means for impressing an output voltage of said oscillator in pushpull relation on the anodes of said silicon controlled rectifiers,
  (e) control means for generating triggering pulses during each half cycle of said square wave,
  (f) means for applying the triggering pulses between the gates and cathodes of the controlled rectifiers,
  (g) and means connected to the contorl means for varying the phase of the triggering pulses with respect to the square wave.

7. Apparatus according to claim 6, wherein said last means includes means for receiving a control signal and varying the phase of the triggering pulses in response to said control signal.

8. Apparatus according to claim 7, comprising
  (a) an output circuit connected to said controlled rectifier circuit and said oscillator,
  (b) said means for varying the phase of the triggering pulses including a feedback circuit connected to the output circuit for varying the phase of the triggering pulses in response to the voltage across the output circuit.

9. Apparatus according to claim 6, including means connected to said source of direct current voltage for generating a starting pulse and applying said pulse to one of said gate electrodes.

10. Apparatus according to claim 6, including an output circuit including a full wave rectifier coupled to said oscillator.

11. Apparatus according to claim 6, wherein the output of said controlled rectifier circuit is connected to the input of the oscillator.

References Cited by the Examiner

UNITED STATES PATENTS

| | | | |
|---|---|---|---|
| 2,977,523 | 3/1961 | Cockrell | 323—22 |
| 3,181,053 | 4/1965 | Amato | 321—2 X |
| 3,196,336 | 7/1965 | Schmidt | 321—18 |
| 3,197,691 | 7/1965 | Gilbert | 321—18 |

OTHER REFERENCES

"Regulated Power Supply," by G. O. Sivigny and J. H. Trewin; published by IBM Technical Disclosure Bulletin, vol. 3, No. 6, November 1960, p. 48.

JOHN F. COUCH, *Primary Examiner.*

L. McCOLLUM, MILTON O. HIRSHFIELD,
*Examiners.*

G. J. BUDOCK, J. C. SQUILLARO, W. H. BEHA,
*Assistant Examiners.*